United States Patent [19]

Süling et al.

[11] Patent Number: 4,791,187

[45] Date of Patent: Dec. 13, 1988

[54] LINEAR POLYURETHANE ELASTOMERS, AND A PROCESS FOR THE PREPARATION THEREOF

[75] Inventors: Carlhans Süling, Odenthal; Michael Kausch, Cologne; Rudi Dauscher, Dormagen, all of Fed. Rep. of Germany

[73] Assignee: Bayer Akteingesellschaft, Leverkusen-Bayerwerk, Fed. Rep. of Germany

[21] Appl. No.: 82,531

[22] Filed: Aug. 7, 1987

[30] Foreign Application Priority Data

Aug. 19, 1986 [DE] Fed. Rep. of Germany ....... 3628141

[51] Int. Cl.$^4$ .............................................. C08G 18/30
[52] U.S. Cl. ........................................ 528/60; 528/63; 528/64; 528/66; 528/70; 528/75; 528/77; 528/83; 528/84; 528/85; 264/328.1; 264/328.6; 264/328.8; 524/783

[58] Field of Search ...................... 528/60, 63, 64, 66, 528/70, 75, 77, 83, 84, 85; 264/328.1, 328.6, 328.8; 524/783

[56] References Cited

U.S. PATENT DOCUMENTS 4,636,531  1/1987  Schmidt et al. ........................ 528/64

*Primary Examiner*—John Kight
*Assistant Examiner*—S. A. Acquah
*Attorney, Agent, or Firm*—Connolly & Hutz

[57] ABSTRACT

The invention relates to essentially linear polyurethane elastomers, having improved properties, made from polyester or polyether diols, diisocyanates and chain extenders, the latter having liquid-crystalline properties; and also films and, in particular, fibres which are prepared on the basis of such liquid-crystalline polyurethane components and are shaped thermoplastically (via melting) or from solutions (by solution spinning processes). The invention furthermore relates to an appropriate process for the preparation of the polyurethane elastomers, particularly of PU elastomer fibres (Elasthan and Spandex fibres).

10 Claims, No Drawings

LINEAR POLYURETHANE ELASTOMERS, AND A PROCESS FOR THE PREPARATION THEREOF

The invention relates to essentially linear polyurethane elastomers, having improved properties, made from polyester or polyether diols, diisocyanates and chain extenders, the latter having liquid-crystalline properties; and also films and, in particular, fibres which are prepared on the basis of such liquid-crystalline polyurethane components and which are shaped thermoplastically (via melting) or from solutions (by solution spinning processes). The invention furthermore relates to an appropriate process for the preparation of the polyurethane elastomers, particularly of PU elastomer fibres (Elasthan and Spandex fibres).

It has been known for some time that polyurethanes can be employed as the basis for the preparation of elastic materials. Such polyurethane elastomers are prepared by polyaddition of long-chain diols to diisocyanates, and also dihydroxy or diamino compounds ("chain extenders") of low molecular weight. Elastomers which contain diamino compounds as chain extenders are, correspondingly, to be named polyurea polyurethanes. The polyurethanes are constructed in a manner such that the macromolecule has a segment structure, i.e. it comprises crystalline and amorphous blocks (hard segments and soft segments respectively). Due to their crystallinity, the hard segments then act as the fixing points of the network, whereas the soft segments, the glass transition temperature of which must be below the use temperature, are responsible for the elasticity of the elastomers.

In order, for example, to prepare elastomer fibres from these polyurethanes or polyurea polyurethanes, these are usually spun from their solutions. Spinning by the particularly economic, non-polluting melt-spinning process, which is to be carried out at high winding-off speeds, has hitherto not been able to establish itself industrially. Elastomers having urea group-containing hard segments cannot be melted without decomposition and are therefore not accessible to the melt-spinning process. In contrast, the thermal stability and strength of thermoplastic polyurethane elastomers, the hard segments of which contain urethane groups, are too low for textile processing. Although the thermal stability of polyurea polyurethane elastomers is greater, an improvement is very desirable here too, above all when use for industrial purposes is intended. This object can be achieved according to the invention by means of polyurethanes of polyurea polyurethanes which are obtained by polyaddition of diisocyanates to macrodiols, of an average molecular weight from 800 to 4000, and essentially linear chain extenders, characterized in that the chain extenders have liquid-crystalline properties.

The polyhydroxyl compounds, as are mentioned, for example, in DE-A No. 2,832,352 or in U.S. Pat. No. 3,719,708, which are known for the preparation of elastomers or elastomer fibres may be used as polyhydroxyl compounds of relatively high-molecular weight (essentially dihydroxyl compounds, also named macrodiols) for the construction of the polyurethanes or polyurea polyurethanes according to the invention. The following may be mentioned as examples: polyester diols, polyether diols, polyacetal diols, polycarbonate diols and other dihydroxyl compounds having melting points below 60° C., preferably below 45° C., as are used in the state of the art for linear polyurethane elastomers or polyester fibres. Polyester diols and polyether diols, or the mixtures thereof, are preferred. Suitable polyester diols are, for example, dicarboxylic acid polyesters, which may contain several alcohols and several carboxylic acids. Copolyesters of adipic acid and 2 to 4 different, preferably longer-chain ($\geqq C_4$) diols are particularly suitable. Hexane-1,6-diol, butane-1,4-diol and neopentyl glycol represent particularly suitable diols. Lactone polyesters or copolyesters based on ε-caprolactone, methyl-ε-caprolactone or methylvalerolactone are also suitable.

Suitable polyether diols are, in particular, polytetramethylene oxide diols, preferably having molecular weights from 1000 to 3000.

Mixtures of different macrodiols may also be used.

The conventional aromatic and aliphatic diisocyanates may be used as diisocyanates. The following may be mentioned as examples of aliphatic diisocyanates: hexamethylene diisocyanate, isophorone diisocyanate, dicyclohexylmethane diisocyanate and trans-1,4-cyclohexane diisocyanate. Particularly usable results can be obtained using 2,4-toluylene diisocyanate, and its corresponding mixtures of isomers, and, in particular, using 4,4'-diphenylmethane diisocyanate, or its corresponding mixtures of isomers.

Of course, it is also possible to use mixtures of aromatic and aliphatic diisocyanates.

However, diisocyanates having liquid-crystalline properties, for example polyisocyanates of the general formula

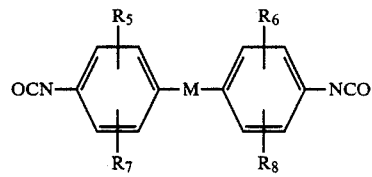

in which
M denotes —HC═CH—, —N═N—, —CH═N— or

or, less preferably, the trans-amide group, or a bond, and
$R^5$, $R^6$, $R^7$ and $R^8$, independently of one another, denote H, alkyl (preferably optionally straight-chain or branched $C_1$–$C_4$-alkyl, particularly methyl) and/or F, Cl, Br, I or CN and $CF_3$, but a symmetrical substitution on both nuclei, for example 3,3'-dimethyl, is present in particular. may also be employed.

Examples are diisocyanates having liquid-crystalline properties, such as

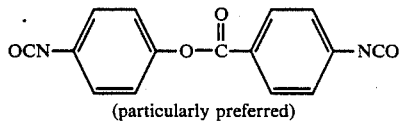

(particularly preferred)

-continued

(less preferred)

The chain extenders according to the invention are characterized in that they have liquid-crystalline properties and are thereby capable of forming mesogenic structures in the polyurethane or polyurea polyurethanes. As described, for example, in "Liquid Crystal Polymers I–II" in "Advances in Polymer Science 59–61", Springer Verlag (1984), the mesogenic groups must comprise at least two aromatic or cycloaliphatic rings which are bonded, via the para position, by short, inflexible bonds, the linear arrangement of the rings is thereby obtained. The mesogenic group represents an element the length of which is significantly greater than the diameter of the aromatic or cycloaliphatic rings. Mesogenic properties are obtained when the length/diameter ratio of the groups is greater than 3:1.

The imino, azo, azoxy, ester and trans-vinylene groups, for example, are suitable as bonding groups between the aromatic or cycloaliphatic rings, and the trans-amide group, or the direct bond, such as, for example, in biphenyl, is less suitable.

In order to be effective as chain extenders during the formation of polyurethanes or polyurea polyurethanes according to the invention, the liquid-crystalline compounds must carry terminal H-acidic groups which are reactive towards NCO groups. The aliphatic OH and the aromatic or aliphatic $NH_2$ group represent preferred H-acidic groups.

Organic chain extenders having LC behaviour, for example of the formula

in which
M denotes

less preferably a bond or the trans-amide group,
$R_1$ to $R_4$ denote hydrogen, halogen, (F, Cl, Br, I), CN, $CF_3$ or saturated aliphatic alkyl substituents, having 1 to 12 C atoms, preferably methyl groups, which are optionally interrupted by ether oxygen atoms, and
n denotes the integers 1, 2 or 3,
X and Y, independently of one another, denote a group, having active H atoms, which is reactive towards isocyanates, for example OH, primary or secondary amino, SH or —CO—NH—$NH_2$ groups, particularly preferably OH and/or $NH_2$ groups in which, in particular, the OH groups are bonded aliphatically,
are suitable.
Examples of X and Y groups are —OH, —(O—$CH_2$—$CH_2$—)$_n$—OH,

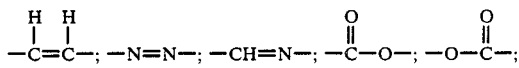

(n=1 to 20, preferably 1), $NH_2$—, —$(CH_2)_m NH_2$, (m=1, 2, 3 or 4, preferably 1 or 3), —CO—NH—$NH_2$, (including —NH—CO—NH—$NH_2$ and —O—CO—NH—$NH_2$) or SH groups.
The following may be mentioned as examples of suitable LC chain-extending compounds:

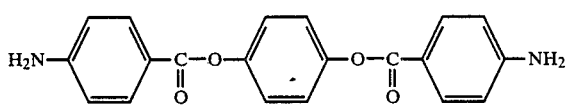

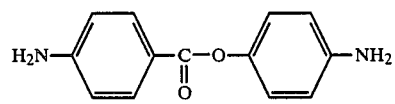

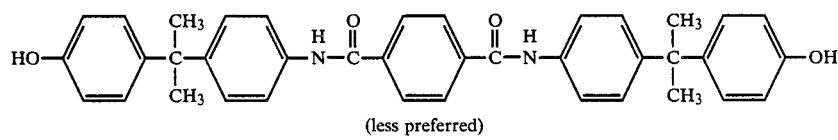
(less preferred)

-continued
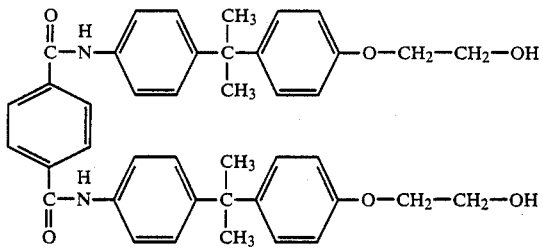
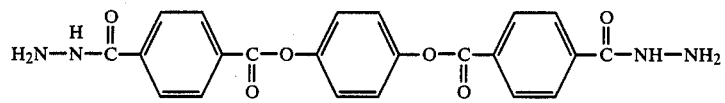
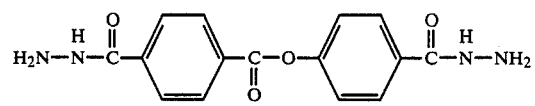
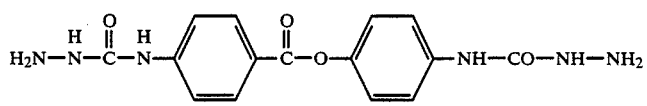
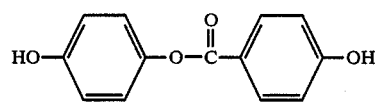
(less preferred due to the phenolic OH groups)
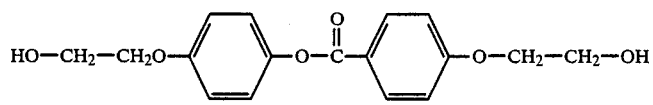
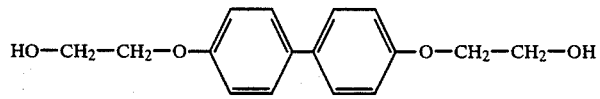
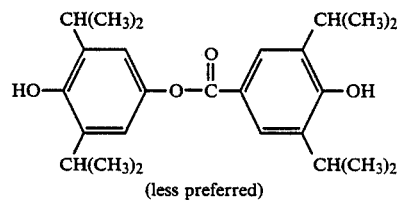
(less preferred)
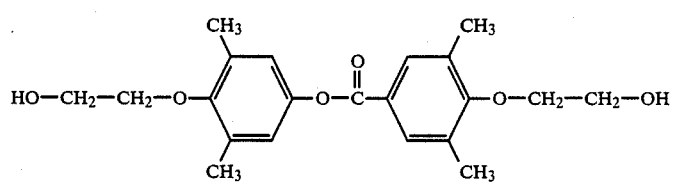
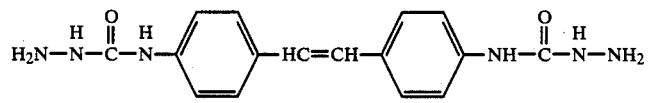
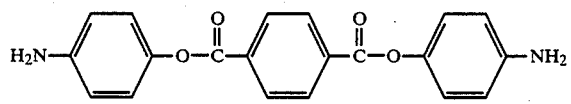

-continued

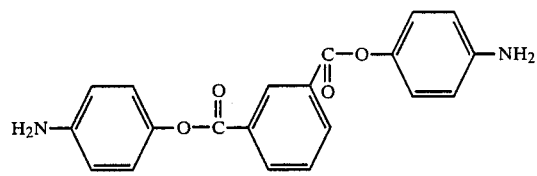

The chain extenders according to the invention may also be reacted in combination with other chain extenders which are otherwise conventional in polyurethane chemistry, such as 1,4-butanediol, ethylene glycol, 1,4-bis(β-hydroxyethoxy)benzene, ethylenediamine, tetramethylenediamine, 1,3- and/or 1,4-cyclohexanediamine, isophoronediamine, 4,4'-diamino-dicyclohexylmethane, 3,3'-dimethyl-4,4'-diamino-dicyclohexylmethane, α,α,α',α'-tetramethyl-m/pxylylenediamine, 4,4'-diaminodiphenylmethane or 3,3'-dimethyl-4,4'-diaminodiphenylmethane.

The polyurethanes according to the invention may be prepared by a one-stage process. In this, the macrodiol and the chain extender, according to the invention, which contains terminal, preferably non-phenolic OH groups, are reacted with the diisocyanate in the melt or in a suitable solvent. Suitable solvents are, for example, dimethylformamide, dimethylacetamide, dimethyl sulphoxide or N-methylpyrrolidone. Conventional additives, such as heat/light/oxidation stabilizers, pigments or dyestuffs, and fillers or the like may be added to the melts or solutions.

The prepolymer process represents another possible preparation. In this, the macrodiol is initially blocked terminally with the diisocyanate, so that a macrodiisocyanate (NCO prepolymer) is obtained. This reaction can also be carried out in melts or in a suitable solvent. The reaction with the chain extenders according to the invention is then carried out in a second stage, it being possible, again, for this reaction to be carried out in melts and in a suitable solvent, for example chlorobenzene, toluene, xylene, DMF or DMA. The prepolymer process is particularly suitable for chain extenders which carry terminal amino groups. Equally, however, other process variations which are conventional in polyurethane chemistry are also suitable. In particular, these also include continuous polyaddition processes (in this respect, cf. U.S. Pat. No. 3,377,308). For the preparation and spinning of elastomer fibres, see H. OERTEL, Chemiefasern/Textilindustrie [Chemical Fibres/Textile Industry], 27/79. Year (1977) pages 1090–1096).

Due to their high strength, high modulus values on stretching without disadvantages of reduced lateral strength, good thermal stabilities, improved heat distortion values, improved thermofixability and shape stability of threads or woven/knitted fabrics made therefrom, (cf. H. OERTEL, Chemiefasern/Textilindustrie [Chemical Fibres/Textile Industry], 20/80th year (1978), pages 42–99; also see the measuring processes therein), the polyurethanes and polyurea urethanes according to the invention are excellently suitable for the preparation of elastomeric shaped articles, particularly elastomer fibres, on which high demands are placed.

The polyurethanes and polyurea polyurethanes according to the invention are very particularly excellently suited for the preparation of high quality elastomer fibres, it being possible for spinning to be carried out by the melt-, dry-, wet- or, if appropriate, also reactive-spinning process. The dry- or wet-spinning process is preferred here for the polyurea polyurethanes, whereas the polyurethanes are processed most favourably by the economic melt-spinning process. Such elastomer fibres exhibit a high hot-tear time, i.e. high possible load at high temperatures before tears occur. A good thermofixability and thermal deformability (cf. Buch: Synthesefasern [Synthetic Fibres], publisher B. v. Falkai, Verlag Chemie, 1981, pages 184–190).

PATENT EXAMPLES

Preparation of liquid-crystalline (LC) chain extenders

Chain extender 1:

980 g (5.28 mol) of p-nitrobenzoyl chloride are dissolved in 2 liters of dimethylformamide and added dropwise, within 30 minutes, to a solution of 290.8 g (2.64 mol) of hydroquinone and 535 g of triethylamine in 2 liters of dimethylformamide with cooling to 35° C. During the reaction, a further 4 liters of dimethylformamide are added in portions in order to keep part of the reaction product, which is produced in bulk, in solution. When the dropwise addition is complete, the mixture is stirred for a further 3 hours, and the product is then precipitated by pouring into 10 liters of water. After recrystallization from dioxane, 867 g of p-phenylenediol bis-(4-nitrobenzoate)[1]. Yield: 79.7%. Melting point 262° C.; nematic-isotropic 281° C.

[1]J. P. Schroeder, D. W. Bristol, J. Org. Chem. 38, 3160 (1973).

200 g of p-phenylenediol bis(4-nitrobenzoate) are dissolved in 2 liters of dioxane and hydrogenated for 5 hours at 60° to 70° C. in an autoclave at 50 bar/H$_2$ (catalyst: 40 g of Raney Ni). The precipitated hydrogenation product is dissolved in dimethylformamide, filtered off from the Raney Ni, and precipitated by pouring into water. Yield after drying 106 g of p-phenylenediol bis-(4-aminobenzoate)[2]. Melting point: solid→nematic) 322° C., on cooling nematic/solid: 275° C.

[2]D. C. Schroeder, J. P. Schroeder, J. Am. Chem. Soc. 96, 4348 (1974).

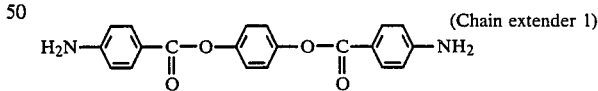

(Chain extender 1)

Chain extender 2:

85 g (0.419 mol) of terephthalyl chloride are added dropwise within 30 minutes at room temperature to a solution of 189 g (0.833 mol) of 4-[1-(4-aminophenyl)-1-methylethyl]-phenol and 70.3 g of sodium hydrogen carbonate in 500 ml of dimethylacetamide. The mixture is then heated to 50° C. 19 liters of CO$_2$ are liberated within 3 hours. When the reaction is complete, the solution is cooled and the resultant bisphenol[3] is precipitated by pouring the reaction mixture into water. Yield after drying 280 g. Recrystallization from methyl ethyl ketone: methanol 1.3:1 with addition of activated charcoal. Melting point 290° C.

[3]Y. Imai, S. Abe, T. Takahashi, J. Polym. Sci., Polym. chem. Ed., 20, 683 (1982).

131.8 g (3.0 mol) of ethylene oxide were added within 11 minutes to 584 g (1 mol) of bisphenol in 1250 ml of dioxane in an autoclave at 130° C. and 3.5 to 5 bar. 1.5 g of triethylamine served as catalyst. When the addition was complete, the mixture was stirred for a further 5 hours at 130° C. The product was subsequently precipitated by pouring into water, dried and recrystallized from 4 liters of nitrobenzene. Yield 535 g, melting point 268° C.

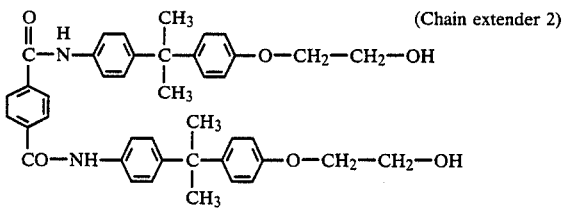
(Chain extender 2)

Chain extender 3:

2,500 g (13.44 mol) of 4,4'-dihydroxybiphenyl were dissolved in 10 liters of dioxane and heated to 130° C. in an autoclave together with 300 ml of ethylene oxide and 12.5 g of triethylamine. Over the course of 5 hours, a further 1,200 ml of ethylene oxide were added, so that a pressure of 4.5 bar was produced in the autoclave. The mixture was then stirred for a further 8 hours at 130° C. After cooling, a pale brown suspension was obtained which was filtered off quickly under suction and washed with dioxane. Crude yield 3,452 g (93.8% of theory).

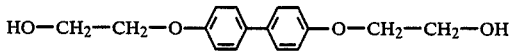

140 g of the crude product were recrystallized from 4.2 liters of n-butanol. 128 g of 4,4'-dihydroxyethoxybiphenyl were obtained in the form of nacreous platelets.

Melting point:
212° C. (solid/nematic transition)
217° C. nematic/isotropic transition.

EXAMPLE 1

160 g of a copolyesterdiol of adipic acid, hexane-1,6-diol and neopentyl glycol (molar ratio of the diols 65:35) of molecular weight 2000, 108.64 g of chain extender 2 and 63.84 g of diphenylmethane 4,4'-diisocyanate were heated to 70° C. together with 0.16 ml of dibutyl tin laurate in 336 g of dimethyl acetamide. A further 9 g of diphenylmethane 4,4'-diisocyanate were added in portions within 2 hours. The solids content of the solution, then highly viscous, was adjusted to 22% using 840 g of dimethylacetamide (solution viscosity: 43.9 Pa.s/20° C.). The inert viscosity of the polymer was 0.98 dl/g (5 g/l of dimethylacetamide at 30° C.).

Relative to the solid, 0.3% of Mg stearate and 1% of Baysilon ® M100 (BAYER AG, Leverkusen) silicone oil were added to the viscous polymer solution, and the solution was dry-spun (via an 8-hole nozzle having holes of diameter 0.20 mm each, cell temperatures of 200° C., air temperature 220° C. and winding-off speed 165 m/min).

| Filament properties: | |
|---|---|
| Denier | 171 dtex. |
| Tenacity | 0.93 cN/dtex. (DIN 53 815) |
| Elongation at break | 314% (DIN 53 815) |
| Modulus 100% | 0.205 cN/dtex. (on first elongation) |
| Modulus 300% | 0.795 cN/dtex. |
| Melting point | Softening at 215° C., melted from 230° C. on a Kofler apparatus. |

The elastomer filaments exhibit high strength and very high modulus values on stretching to 100 or 300% elongation.

EXAMPLE 2

300 g (0.15 mol) of polytetramethylene oxide diol, of molecular weight 2000, and 77.6 g (0.283 mol) of 4,4'-di(β-hydroxyethoxy-)biphenyl were warmed to 80° C. under nitrogen together with 491.4 g of dimethylacetamide. 113.8 g (0.455 mol) of 4,4'-diphenylmethane diisocyanate were then added with stirring, and the mixture was kept at 70° C. for 2 hours. A very highly viscous solution had then been produced in which free NCO groups could no longer be detected by titration. The mixture was diluted to a solids content of 20% by addition of 1,415 g of DMAC. This solution had a solution viscosity of 227.6 Pa.s at 20° C. and an inherent viscosity of 1.28 dl/g (5 g/l of dimethylacetamide at 30° C.).

Relative to the solid, 4% of titanium dioxide, 0.3% of Mg stearate and 1% of Baysilon ® M100 (BAYER-AG, D-5090 Leverkusen) silicone oil were added to the viscous polymer solution, and the solution was dry-spun (cf. Example 1).

The spinning conditions were as in Example 1, apart from the air temperature in the cell of 210° C. and the winding-off speed of 151 m/min.

| Filament properties: | |
|---|---|
| Denier | 185 dtex. |
| Tenacity | 0.96 cN/dtex. (DIN 53 815) |
| Elongation at break | 412% (DIN 53 815) |
| Modulus 300% | 0.386 cN/dtex. |
| Residual elongation (after elongating 5 times to 300% and 60 seconds after release) | 56% |
| Hot-tear time at 193.7° C. (in nitrogen) Determination, see DE-A 2,707,659) | 16.4 seconds. |

EXAMPLE 3

300 g (0.3 mol) of polytetramethylene oxide diol, of molecular weight 1000, were warmed to 70° C. under nitrogen together with 37.4 g 0.136 mol) of 4,4'-di-(β-hydroxyethoxy)-biphenyl and 0.3 ml of dibutyltin laurate in 452.5 g of dimethylacetamide. 115.1 g (0.460 mol) of 4,4'-diphenylmethane diisocyanate were then added with stirring within 10 minutes, and the mixture was stirred for a further 35 minutes at 60° C. A very highly viscous solution had been produced in which NCO groups could no longer be detected by titration. The mixture was diluted to a solids content of 22% by addition of 1,152 g of dimethylacetamide. This solution had a solution viscosity of 138 Pa.s at 20° C. and an inherent viscosity of 1.22 dl/g (5 g/l of dimethylacetamide at 30° C.).

Relative to the solid, 4% of titanium dioxide, 0.3% of Mg stearate and 1% of Baysilon ® M100 silicone oil were added to the viscous polymer solution, and the solution was dry-spun (spinning conditions as in Example 2).

| Filament properties: | |
|---|---|
| Denier | 169 dtex. |
| Tenacity | 1.21 cN/dtex. (DIN 53 815) |
| Elongation at break | 421% (DIN 53 815) |
| Modulus 300% | 0.276 cN/dtex. (on first elongation) |
| Residual elongation | 34% (after stretching 3 times to 300%, 60 seconds after release). |

COMPARISON EXAMPLE 300 g (0.15 mol) of polytetramethylene oxide diol, of molecular weight 2000, 89.6 g (0.283 mol) of 1,1'-isopropylidene-bis-(p-phenylene-oxy)-di-β-ethanol (Dianol ® 22 from AKZO-Chemie)

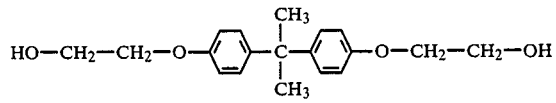

and 0.3 ml of dibutyltin laurate in 504.4 g of dimethylacetamide were warmed to 36° C. under nitrogen. 114.8 g (0.459 mol) of 4,4'-diphenylmethane diisocyanate were then added with stirring, and the mixture was kept at 55° C. for 15 minutes. A very highly viscous solution had then been produced in which free NCO groups could no longer be detected by titration. The mixture was diluted to a solids content of 20% by addition of 1,515 g of dimethylacetamide. This solution had a solution viscosity of 166.2 Pa.s at 20° C. and an inherent viscosity of 1.31 dl/g (5 g/l of dimethylacetamide at 30° C.).

Relative to the solid, 4% of titanium dioxide, 0.3% of Mg stearate and 1% of Baysilon ® M100 (Bayer AG, D-5090 Leverkusen) silicone oil were added to the viscous polymer solution, and the solution was dry-spun. The spinning conditions were as in Example 1, aparts from the air temperature of 230° C. and the winding-off speed of 150 m/min.

| Filament properties: | |
|---|---|
| Denier | 197 dtex |
| Tenacity | 0.52 cN/dtex. (DIN 53 815) |
| Elongation at break | 581% (DIN 53 815) |
| Modulus 300% | 0.033 cN/dtex |
| Residual elongation | 40% (after stretching 5 times to 300%, 60 seconds after release) |

In particular, very low moduli are obtained.

We claim:

1. A fiber comprising an essentially linear elastomeric polyurethane, polyurethane polyurea or combination thereof, where the elastomer is made from one or more dihydroxyl compounds of relatively high molecular weight, one or more diisocyanates and one or more organic chain extenders having liquid-crystalline properties of the general formula

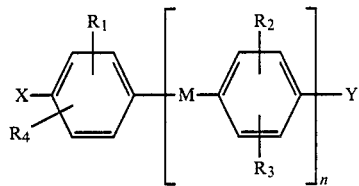

in which
M denotes

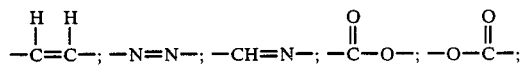

a single bond or a trans-amide group,
$R_1$, $R_2$, $R_3$ and $R_4$, independently of one another, denote a hydrogen, fluorine, chlorine, bromine or iodine atom, a cyano or trifluoromethyl group, an alkyl group with 1 to 12 carbon atoms or an alkyl group with 1 to 12 carbon atoms interrupted by one or more ether oxygen atoms,
n is 1, 2 or 3, and
X and Y, independently of each other, denote a group, which is reactive towards isocyanates, selected from OH, primary or secondary amino, SH or —CO—NH—$NH_2$ groups, with the proviso that when X is a primary amino group, M cannot be a single bond.

2. An elastomer according to claim 1, in which M denotes

3. A fiber according to claim 1, in which one or more of $R_1$, $R_2$, $R_3$ and $R_4$ denotes a methyl group.

4. A fiber according to claim 1, in which X and Y independently of each other denote OH and/or $NH_2$ groups.

5. A fiber according to claim 4, in which X and Y denote OH groups which are bonded (cyclo)-aliphatically.

6. A fiber according to claim 1, in which the dihydroxy compound is selected from polyester diols, polyether diols or mixtures thereof.

7. A fiber according to claim 6, in which the dihydroxy compound is selected from polyesters derived from hexane-1,6-diol, butane-1,4-diol, neopentyl glycol or polytetramethylene oxide diols having a molecular weight ($M_w$) from 1,000 to 3,000.

8. A fiber according to claim 1, in which the diisocyanate is selected from 2,4-toluylene diisocyate, isomer mixtures thereof, 4,4'-diphenylmethane diisocyanate or isomer mixtures thereof.

9. A process for the production of a fiber according to claim 1, by the polyaddition of a diisocyanate to a dihydroxyl compound of relatively high molecular weight, in the presence of one or more chain extenders, at least one of the chain extenders having liquid-crystalline properties of the general formula

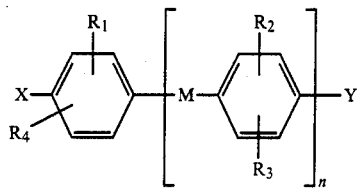

in which

M denotes

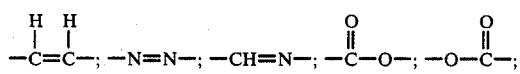

a single bond or a trans-amide group, $R_1$, $R_2$, $R_3$ and $R_4$, independently of one another, denote a hydrogen, fluorine, chlorine, bromine or iodine atom, a cyano or trifluoromethyl group, an alkyl group with 1 to 12 carbon atoms or an alkyl group with 1 to 12 carbon atoms interrupted by one or more ether oxygen atoms, n is 1, 2 or 3, and X and Y, independently of each other, denote a group, which is reactive towards isocyanates, selected from OH, primary or secondary amino, SH or —CO—NH—NH$_2$ groups, with the proviso that when X is a primary amino group, M cannot be a single bond.

10. A process according to claim 9, in which the fiber is shaped from a melt or from a solution.

* * * * *